United States Patent [19]

Misra

[11] Patent Number: 5,069,889
[45] Date of Patent: Dec. 3, 1991

[54] CRYSTALLINE ALUMINUM PHOSPHORUS COMPOUNDS

[75] Inventor: Chanakya Misra, Pittsburgh, Pa.

[73] Assignee: Aluminum Company of America, Pittsburgh, Pa.

[21] Appl. No.: 556,045

[22] Filed: Jul. 20, 1990

Related U.S. Application Data

[63] Continuation of Ser. No. 143,178, Jan. 13, 1988, abandoned.

[51] Int. Cl.$^5$ ............................................. C01B 25/45
[52] U.S. Cl. .................................................... 423/306
[58] Field of Search ......................................... 423/306

[56] References Cited

U.S. PATENT DOCUMENTS 3,554,921  1/1971  Kichline et al. .................... 423/306

Primary Examiner—Wayne A. Langel
Attorney, Agent, or Firm—Daniel A. Sullivan, Jr.

[57] ABSTRACT

Crystalline aluminum phosphorus compounds are provided which are useful as flame retardants and strength additives for organic polymeric materials. Typical compounds are formed from the reaction of aluminum hydroxide and a monobasic, dibasic or tribasic sodium phosphate.

14 Claims, 3 Drawing Sheets

Figure 1

CRYSTALLINE ALUMINUM PHOSPHORUS COMPOUNDS

CROSS REFERENCE TO RELATED APPLICATION

This is a continuation of U.S. Pat. application Ser. No. 7/143,178, filed Jan. 13, 1988 re Crystalline Aluminum Phosphorus Compounds to Chanakya Misra, now abandoned.

DESCRIPTION

1. Technical Field

The invention relates to inorganic crystalline alkali metal and ammonium aluminum phosphorus compounds which are readily prepared and which are useful in providing fire retardation and strength for organic polymeric materials.

2. Background of Invention

A number of aluminum phosphates are known. For example, U.S. Pat. No. 2,909,451 discloses the reaction of a water-soluble aluminum salt and at least a stoichiometric amount of a water-soluble orthophosphate in an aqueous medium to produce a precipitate.

Similarly, U.S. Pat. No. 3,348,910 describes the preparation of magnesium ammonium phosphate by reacting a magnesium compound such as magnesium hydroxide with an excess of monoammonium dihydrogen phosphate.

Complex phosphates are illustrated by U.S. Pat. No. 2,550,490 of the formula:

$$MM'_3H_{14}(PO_4)_8 \cdot 4H_2O$$

where M is an alkali metal including the ammonium radical, and M' is aluminum or iron. The compounds are useful as baking acids.

DISCLOSURE OF INVENTION

It has now been discovered that novel crystalline phosphorus compounds can be easily prepared that are useful in imparting flame retardation and strength to host materials such as organic polymers. More particularly, the phosphorus compounds have the general formula:

$$x(R_2O) \cdot Al_2O_3 \cdot y(P_2O_5) \cdot z(H_2O)$$

wherein R is an alkali metal, x is an integer from 1 to 4, y is an integer from 1 to 2, and z is a number, to include fractions, from 2 to 3.5.

The preferred compounds comprise sodium or potassium as the alkali metal, but sodium is the most preferred. Accordingly, the invention will be discussed with emphasis on the sodium aluminum phosphorus compounds, with the understanding that the other compounds can be employed as well.

MODES FOR CARRYING OUT INVENTION

The novel compounds can be prepared by reacting a phosphate of the formula:

$$(R)_a(H)_b PO_4$$

wherein R is as previously defined and a is an integer of from 1 to 3, and b=3−a with aluminum hydroxide Al(OH)$_3$ or water-soluble aluminum salt in an amount to provide between about 1 and about 2.5 moles of aluminum per mole of phosphorus.

Water-soluble aluminum salts which can be employed include aluminum nitrate, aluminum chloride, aluminum sulfate, and sodium aluminate but others may also be suitable.

The reaction is conducted in a solvent, preferably water, and a reaction temperature of at least about 150° C., preferably between about 150° C. and about 250° C. has been successfully employed at a pressure of the vapor pressure of the mixture at the reaction temperature with agitation of the reaction mixture.

The following examples will serve to illustrate the invention. All parts and percentages in said examples and elsewhere in the specification and claims are by weight unless otherwise indicated.

EXAMPLES

The reactants, quantities, reaction conditions, properties, chemical composition and approximate chemical formula are shown in the following Table I. The reaction was conducted in a one liter stainless steel pressure vessel with vigorous agitation.

TABLE I

| | Synthesis Conditions | | | | | Properties of Compounds | | | |
| --- | --- | --- | --- | --- | --- | --- | --- | --- | --- |
| | | | | | | Prod | | | Decomp |
| Ex. | g Al(OH)$_3$ | g Na-Phosphate | g H$_2$O | Time h | Temp °C. | wt g | Crystal Shape | Density g/cm$^3$ | Temp °C. TGA |
| 1 | 30 | 60 g NaH$_2$PO$_4$ | 400 | 4 | 200 | 61 | Rod | 2.60 | 150–500 |
| 2 | 30 | 60 g Na$_2$HPO$_4$ | 400 | 4 | 200 | 80 | Rod | 2.60 | 270–550 |
| 3 | 30 | 60 g Na$_3$PO$_4$ | 400 | 4 | 200 | 40 | Rod | 2.50 | 450–580 |

Figure 1:
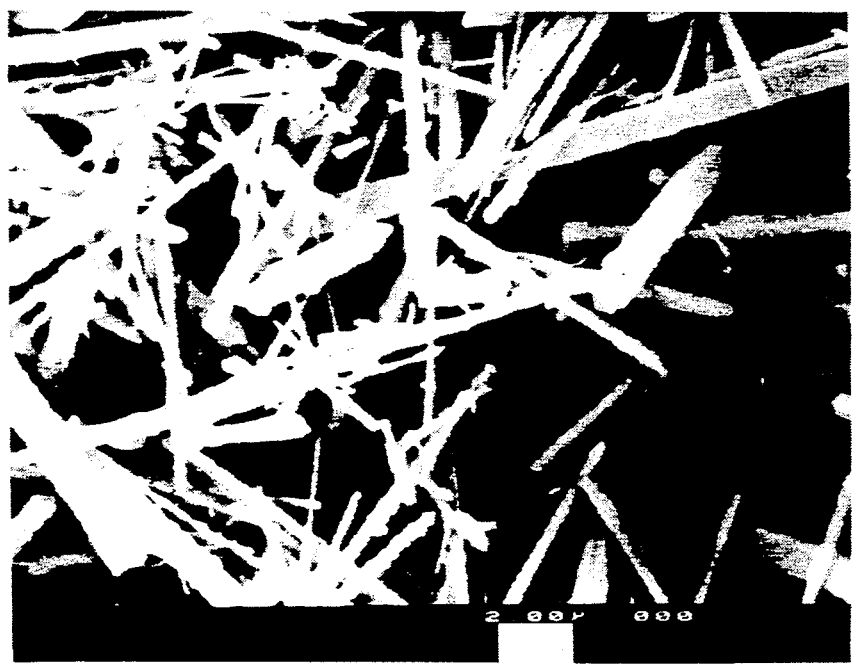
FIG. 1 is a photo microprint (#000) of the compound of Example 1, and the scale indicated by the rectangle is 2 u (2 micrometers).
Figure 2:
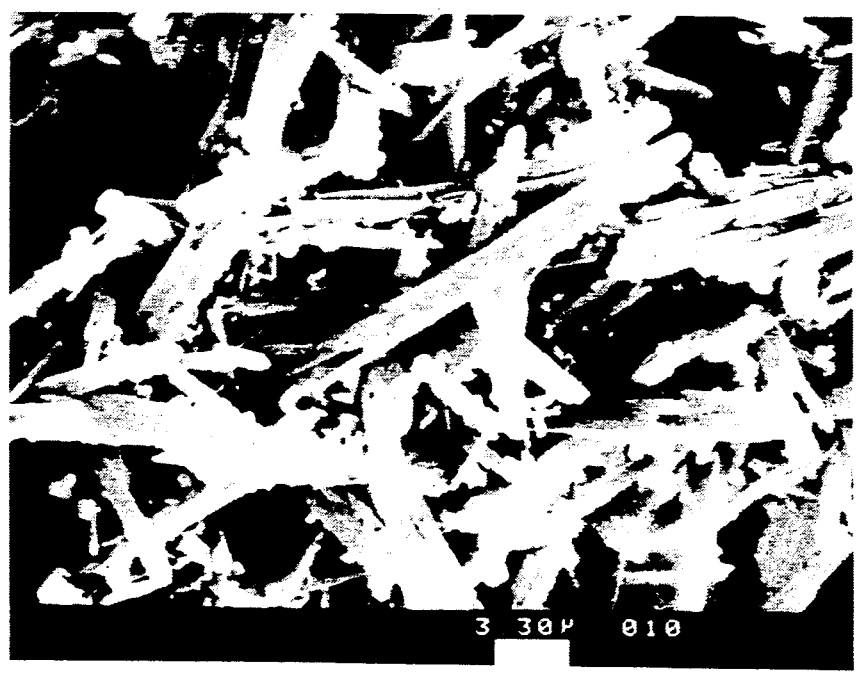
FIG. 2 is a photo microprint (#010) of the compound of Example 2, and the scale indicated by the rectangle is 3.3 u.
Figure 3:
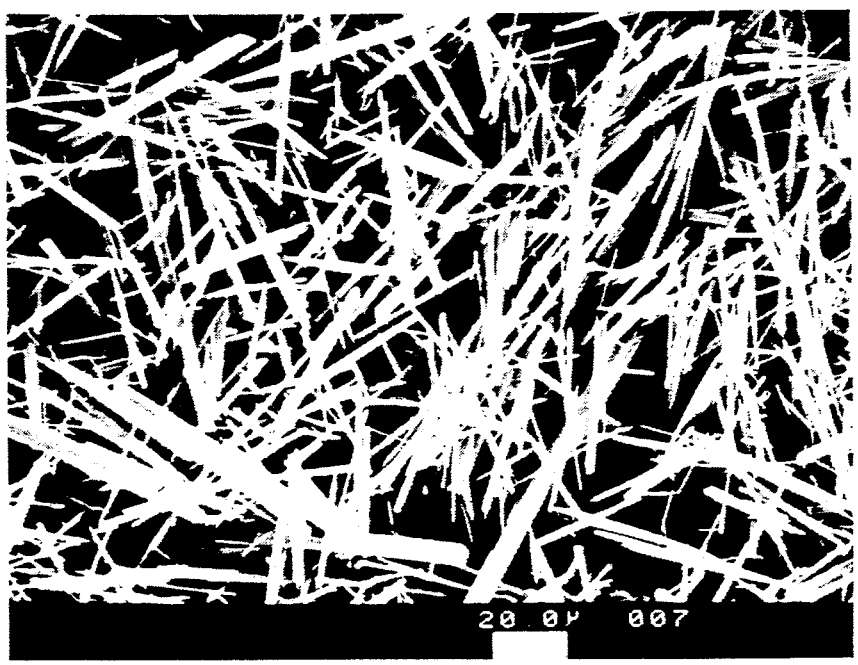
FIG. 3 is a photo microprint (#007) of the compound of Example 3, and the scale indicated by the rectangle is 20 u.

| | Chemical Composition of Compound | | | | | Identification | |
| --- | --- | --- | --- | --- | --- | --- | --- |
| Ex. | wt % Al$_2$O$_3$ | wt % Na$_2$O | wt % P$_2$O$_5$ | wt % H$_2$O | Approximate Chemical Formula | SEM | XRD Pattern |
| 1 | 32.0 | 16.7 | 40.0 | 11.3 | Na$_2$O·Al$_2$O$_3$·P$_2$O$_5$·2H$_2$O | FIG. 1 | Table II |
| 2 | 24.4 | 28.4 | 32.7 | 14.5 | 2Na$_2$O·Al$_2$O$_3$·P$_2$O$_5$·3.5H$_2$O | FIG. 2 | Table III |
| 3 | 15.2 | 38.0 | 40.0 | 6.8 | 4Na$_2$O·Al$_2$O$_3$·2P$_2$O$_5$·2.5H$_2$O | FIG. 3 | Table IV |

As can be seen from the Table I all three crystalline sodium aluminum phosphates form acicular (or rod-shaped) crystals. They release water endothermically when heated in the temperature range of 150° C. to 580° C. Because of their acicular shape, endothermic decomposition and phosphate content, these compounds can be used as strength-improving and flame retardant additives in rubbers, polymers, plastics, papers and other organic materials.

Typically from 10 to about 60% of the phosphate will be sufficient for its use as a flame retardant and as a strength improving material.

The following Tables II to IV depict the X-ray diffraction patterns for the three examples.

While the invention has been illustrated by several embodiments, obvious variations may occur to one of ordinary skill and thus the invention is intended to be limited only by the appended claims.

TABLE II

X-ray Diffraction Pattern of the Compound Obtained in Example 1

2THETA FROM: 7
2THETA TO: 87         MAX CTS/SEC: 3860
STEP PEAK: .03        ICO12: 378838
STEP-BKGRND: .09      SENSITIVITY: 2
SECOND/STEP: 1        SHOULDER CT: 10

| 2-THETA | D-SPACE | NET-C/S | I/I-MAX | 2-THETA | D-SPACE | NET-C/S | I/I-MAX |
|---|---|---|---|---|---|---|---|
| 7.34 | 12.0481 | 1076 | 29.9 | 42.70 | 2.1176 | 416 | 11.6 |
| 12.13 | 7.2977 | 1123 | 31.2 | 43.51 | 2.0797 | 365 | 10.1 |
| 14.80 | 5.9855 | 739 | 20.5 | 44.11 | 2.0532 | 123 | 3.4 |
| 15.16 | 5.8441 | 155 | 4.3 | 44.96 | 2.0163 | 87 | 2.4 |
| 15.85 | 5.5903 | 1218 | 33.9 | 45.35 | 1.9995 | 448 | 12.5 |
| 18.28 | 4.8532 | 1432 | 39.8 | 46.96 | 1.9349 | 420 | 11.7 |
| 18.63 | 4.7622 | 103 | 2.9 | 47.64 | 1.9087 | 219 | 6.1 |
| 19.12 | 4.6419 | 443 | 12.3 | 48.18 | 1.8885 | 995 | 27.6 |
| 20.37 | 4.3598 | 1246 | 34.6 | 48.75 | 1.8678 | 436 | 12.1 |
| 20.96 | 4.2391 | 1503 | 41.8 | 49.42 | 1.8443 | 328 | 9.1 |
| 21.37 | 4.1578 | 529 | 14.7 | 50.08 | 1.8214 | 190 | 5.3 |
| 21.85 | 4.0676 | 158 | 4.4 | 50.17 | 1.8184 | 156 | 4.3 |
| 22.15 | 4.0134 | 236 | 6.6 | 50.26 | 1.8153 | 117 | 3.2 |
| 22.30 | 3.9865 | 201 | 5.6 | 50.51 | 1.8068 | 164 | 4.5 |
| 22.48 | 3.9550 | 158 | 4.4 | 52.22 | 1.7517 | 448 | 12.5 |
| 22.64 | 3.9283 | 154 | 4.3 | 52.45 | 1.7445 | 213 | 5.9 |
| 22.75 | 3.9087 | 125 | 3.5 | 52.60 | 1.7399 | 259 | 7.2 |
| 22.97 | 3.8715 | 120 | 3.3 | 54.49 | 1.6839 | 203 | 5.6 |
| 23.83 | 3.7339 | 2283 | 63.5 | 54.79 | 1.6754 | 430 | 12.0 |
| 24.19 | 3.6791 | 263 | 7.3 | 55.21 | 1.6637 | 169 | 4.7 |
| 25.45 | 3.4998 | 1231 | 34.2 | 58.84 | 1.5694 | 190 | 5.3 |
| 26.80 | 3.3265 | 1588 | 44.1 | 59.31 | 1.5582 | 357 | 9.9 |
| 28.15 | 3.1699 | 3135 | 87.1 | 60.42 | 1.5320 | 254 | 7.1 |
| 28.66 | 3.1147 | 1079 | 30.0 | 60.61 | 1.5277 | 220 | 6.1 |
| 29.52 | 3.0255 | 1792 | 49.8 | 61.99 | 1.4970 | 394 | 10.9 |
| 30.08 | 2.9711 | 3598 | 100.0 | 62.59 | 1.4840 | 94 | 2.6 |
| 30.46 | 2.9346 | 175 | 4.9 | 63.35 | 1.4681 | 124 | 3.4 |
| 30.82 | 2.9011 | 209 | 5.8 | 63.50 | 1.4651 | 105 | 2.9 |
| 31.60 | 2.8310 | 213 | 5.9 | 63.82 | 1.4584 | 127 | 3.5 |
| 32.71 | 2.7377 | 150 | 4.2 | 65.78 | 1.4196 | 95 | 2.6 |
| 33.24 | 2.6953 | 1345 | 37.4 | 66.52 | 1.4057 | 123 | 3.4 |
| 34.00 | 2.6370 | 1057 | 29.4 | 67.24 | 1.3923 | 300 | 8.3 |
| 34.41 | 2.6060 | 322 | 8.9 | 67.36 | 1.3901 | 307 | 8.5 |
| 35.38 | 2.5370 | 695 | 19.3 | 67.81 | 1.3820 | 432 | 12.0 |
| 36.28 | 2.4759 | 447 | 12.4 | 71.68 | 1.3166 | 106 | 3.0 |
| 36.55 | 2.4584 | 312 | 8.7 | 71.85 | 1.3140 | 131 | 3.6 |
| 36.94 | 2.4334 | 334 | 9.3 | 75.47 | 1.2597 | 141 | 3.9 |
| 37.67 | 2.3877 | 503 | 14.0 | 75.55 | 1.2585 | 142 | 4.0 |
| 38.29 | 2.3507 | 431 | 12.0 | 75.66 | 1.2569 | 137 | 3.8 |
| 38.74 | 2.3243 | 135 | 3.7 | 75.77 | 1.2554 | 121 | 3.4 |
| 39.52 | 2.2802 | 137 | 3.8 | 75.86 | 1.2542 | 96 | 2.7 |
| 40.15 | 2.2459 | 240 | 6.7 | 78.22 | 1.2220 | 110 | 3.1 |
| 40.63 | 2.2205 | 99 | 2.7 | 78.46 | 1.2190 | 90 | 2.5 |
| 41.63 | 2.1695 | 187 | 5.2 | 78.58 | 1.2173 | 83 | 2.3 |
| 41.95 | 2.1536 | 193 | 5.4 | 83.04 | 1.1630 | 111 | 3.1 |
| 42.04 | 2.1492 | 177 | 4.9 | 83.20 | 1.1611 | 133 | 3.7 |

TABLE III

X-ray Diffraction Pattern of the Compound Obtained in Example 2

2THETA FROM: 7
2THETA TO: 87         MAX CTS/SEC: 7025
STEP PEAK: .03        ICO12: 357207
STEP-BKGRND: .09      SENSITIVITY: 2
SECOND/STEP: 1        SHOULDER CT: 10

| 2-THETA | D-SPACE | NET-C/S | I/I-MAX | 2-THETA | D-SPACE | NET-C/S | I/I-MAX |
|---|---|---|---|---|---|---|---|
| 11.53 | 7.6721 | 1623 | 23.9 | 46.69 | 1.9454 | 567 | 8.3 |
| 12.05 | 7.3440 | 1295 | 19.0 | 47.51 | 1.9136 | 1570 | 23.1 |
| 13.03 | 6.7943 | 226 | 3.3 | 49.14 | 1.8539 | 163 | 2.4 |
| 15.20 | 5.8296 | 189 | 2.8 | 49.24 | 1.8505 | 146 | 2.1 |
| 16.72 | 5.3022 | 782 | 11.5 | 49.71 | 1.8341 | 648 | 9.5 |
| 17.05 | 5.2000 | 92 | 1.4 | 50.40 | 1.8107 | 359 | 5.3 |

TABLE III-continued

X-ray Diffraction Pattern of the Compound Obtained in Example 2

2THETA FROM: 7  
2THETA TO: 87  
STEP PEAK: .03  
STEP-BKGRND: .09  
SECOND/STEP: 1  
MAX CTS/SEC: 7025  
ICO12: 357207  
SENSITIVITY: 2  
SHOULDER CT: 10

| 2-THETA | D-SPACE | NET-C/S | I/I-MAX | 2-THETA | D-SPACE | NET-C/S | I/I-MAX |
|---|---|---|---|---|---|---|---|
| 17.20 | 5.1568 | 91 | 1.3 | 50.69 | 1.8008 | 129 | 1.9 |
| 17.35 | 5.1111 | 87 | 1.3 | 50.85 | 1.7956 | 124 | 1.8 |
| 18.47 | 4.8041 | 6076 | 89.3 | 51.38 | 1.7784 | 133 | 2.0 |
| 20.26 | 4.3828 | 1235 | 18.2 | 51.57 | 1.7721 | 160 | 2.4 |
| 20.50 | 4.3323 | 513 | 7.5 | 51.85 | 1.7633 | 320 | 4.7 |
| 21.52 | 4.1285 | 139 | 2.0 | 52.54 | 1.7417 | 797 | 11.7 |
| 23.22 | 3.8299 | 130 | 1.9 | 54.40 | 1.6865 | 272 | 4.0 |
| 24.07 | 3.6974 | 144 | 2.1 | 55.43 | 1.6576 | 34 | 1.2 |
| 24.78 | 3.5922 | 4284 | 62.9 | 55.66 | 1.6513 | 104 | 1.5 |
| 25.57 | 3.4836 | 315 | 4.6 | 57.25 | 1.6092 | 190 | 2.8 |
| 26.26 | 3.3942 | 570 | 8.4 | 57.34 | 1.6068 | 191 | 2.8 |
| 26.92 | 3.3119 | 508 | 7.5 | 57.52 | 1.6022 | 113 | 1.7 |
| 28.10 | 3.1749 | 762 | 11.2 | 58.14 | 1.5867 | 145 | 2.1 |
| 28.33 | 3.1502 | 579 | 8.5 | 58.30 | 1.5826 | 97 | 1.4 |
| 28.78 | 3.1021 | 258 | 3.8 | 58.60 | 1.5753 | 167 | 2.5 |
| 31.78 | 2.8157 | 107 | 1.6 | 58.78 | 1.5709 | 136 | 2.0 |
| 32.08 | 2.7904 | 175 | 2.6 | 59.05 | 1.5643 | 180 | 2.6 |
| 32.62 | 2.7451 | 585 | 8.6 | 59.23 | 1.5600 | 132 | 1.9 |
| 33.85 | 2.6481 | 6720 | 98.7 | 59.68 | 1.5493 | 300 | 4.4 |
| 34.21 | 2.6210 | 1085 | 15.9 | 60.04 | 1.5409 | 156 | 2.3 |
| 34.81 | 2.5772 | 2982 | 43.8 | 60.74 | 1.5247 | 1305 | 19.2 |
| 35.53 | 2.5265 | 3397 | 49.9 | 62.17 | 1.4932 | 1362 | 20.0 |
| 36.76 | 2.4450 | 1150 | 16.9 | 64.03 | 1.4542 | 556 | 8.2 |
| 36.94 | 2.4333 | 955 | 14.0 | 64.68 | 1.4412 | 119 | 1.7 |
| 37.60 | 2.3921 | 696 | 10.2 | 64.79 | 1.4388 | 96 | 1.4 |
| 38.07 | 2.3639 | 106 | 1.6 | 66.17 | 1.4122 | 138 | 2.0 |
| 39.65 | 2.2730 | 630 | 9.3 | 68.85 | 1.3636 | 128 | 1.9 |
| 40.05 | 2.2510 | 199 | 2.9 | 70.76 | 1.3314 | 83 | 1.2 |
| 40.61 | 2.2216 | 469 | 6.9 | 70.86 | 1.3297 | 99 | 1.4 |
| 40.99 | 2.2018 | 124 | 1.8 | 71.29 | 1.3228 | 247 | 3.6 |
| 41.15 | 2.1937 | 103 | 1.5 | 71.43 | 1.3205 | 237 | 3.5 |
| 41.73 | 2.1644 | 237 | 3.5 | 72.38 | 1.3056 | 112 | 1.6 |
| 42.92 | 2.1073 | 368 | 5.4 | 73.58 | 1.2873 | 230 | 3.4 |
| 43.19 | 2.0944 | 281 | 4.1 | 75.31 | 1.2619 | 201 | 3.0 |
| 43.51 | 2.0799 | 338 | 5.0 | 75.43 | 1.2602 | 169 | 2.5 |
| 44.05 | 2.0557 | 550 | 8.1 | 75.52 | 1.2589 | 169 | 2.5 |
| 44.65 | 2.0294 | 327 | 4.8 | 79.61 | 1.2042 | 140 | 2.1 |
| 44.89 | 2.0191 | 113 | 1.7 | 79.69 | 1.2032 | 155 | 2.3 |
| 45.46 | 1.9952 | 281 | 4.1 | 80.16 | 1.1973 | 297 | 4.4 |
| 45.78 | 1.9820 | 155 | 2.3 | | | | |

TABLE IV

X-ray Diffraction Pattern of the Compound Obtained in Example 3

2THETA FROM: 7  
2THETA TO: 87  
STEP PEAK: .03  
STEP-BKGRND: .09  
SECOND/STEP: 1  
MAX CTS/SEC: 11738  
ICO12: 223101  
SENSITIVITY: 2  
SHOULDER CT: 10

| 2-THETA | D-SPACE | NET-C/S | I/I-MAX | 2-THETA | D-SPACE | NET-C/S | I/I-MAX |
|---|---|---|---|---|---|---|---|
| 11.58 | 7.6394 | 3623 | 31.3 | 45.85 | 1.9791 | 152 | 1.3 |
| 12.07 | 7.3336 | 777 | 6.7 | 46.78 | 1.9419 | 187 | 1.6 |
| 13.06 | 6.7810 | 542 | 4.7 | 47.56 | 1.9117 | 7440 | 64.3 |
| 14.74 | 6.0094 | 141 | 1.2 | 49.25 | 1.8502 | 396 | 3.4 |
| 15.16 | 5.8455 | 205 | 1.8 | 49.68 | 1.8350 | 863 | 7.5 |
| 15.24 | 5.8120 | 179 | 1.5 | 50.32 | 1.8133 | 282 | 2.4 |
| 16.75 | 5.2927 | 831 | 7.2 | 51.49 | 1.7748 | 135 | 1.2 |
| 18.50 | 4.7965 | 1570 | 13.6 | 51.82 | 1.7644 | 322 | 2.8 |
| 21.57 | 4.1198 | 293 | 2.5 | 52.67 | 1.7378 | 101 | 0.9 |
| 21.79 | 4.0786 | 139 | 1.2 | 54.36 | 1.6877 | 637 | 5.5 |
| 21.94 | 4.0518 | 117 | 1.0 | 54.76 | 1.6763 | 139 | 1.2 |
| 22.42 | 3.9654 | 163 | 1.4 | 55.57 | 1.6538 | 130 | 1.1 |
| 22.60 | 3.9347 | 115 | 1.0 | 56.05 | 1.6408 | 104 | 0.9 |
| 22.90 | 3.8834 | 104 | 0.9 | 57.31 | 1.6076 | 794 | 6.9 |
| 23.27 | 3.8228 | 567 | 4.9 | 58.13 | 1.5869 | 89 | 0.8 |
| 24.06 | 3.6982 | 419 | 3.6 | 59.04 | 1.5646 | 257 | 2.2 |
| 24.81 | 3.5887 | 3346 | 28.9 | 59.65 | 1.5500 | 132 | 1.1 |
| 26.28 | 3.3908 | 1269 | 11.0 | 59.77 | 1.5472 | 148 | 1.3 |
| 26.96 | 3.3076 | 382 | 3.3 | 59.89 | 1.5444 | 109 | 0.9 |
| 28.14 | 3.1707 | 201 | 1.7 | 59.99 | 1.5421 | 83 | 0.7 |
| 29.82 | 2.9957 | 108 | 0.9 | 60.77 | 1.5242 | 2075 | 17.9 |
| 31.70 | 2.8222 | 183 | 1.6 | 62.12 | 1.4941 | 1207 | 10.4 |
| 32.58 | 2.7484 | 1174 | 10.1 | 64.09 | 1.4529 | 146 | 1.3 |

TABLE IV-continued

X-ray Diffraction Pattern of the Compound Obtained in Example 3

2THETA FROM: 7
2THETA TO: 87
STEP PEAK: .03
STEP-BKGRND: .09
SECOND/STEP: 1

MAX CTS/SEC: 11738
ICO12: 223101
SENSITIVITY: 2
SHOULDER CT: 10

| 2-THETA | D-SPACE | NET-C/S | I/I-MAX | 2-THETA | D-SPACE | NET-C/S | I/I-MAX |
|---|---|---|---|---|---|---|---|
| 33.85 | 2.6479 | 11572 | 100.0 | 64.79 | 1.4389 | 147 | 1.3 |
| 34.25 | 2.6179 | 1514 | 13.1 | 66.32 | 1.4093 | 85 | 0.7 |
| 34.87 | 2.5732 | 1783 | 15.4 | 67.15 | 1.3940 | 164 | 1.4 |
| 35.21 | 2.5490 | 2891 | 25.0 | 67.78 | 1.3825 | 87 | 0.8 |
| 35.59 | 2.5226 | 1299 | 11.2 | 68.57 | 1.3686 | 164 | 1.4 |
| 36.73 | 2.4467 | 1179 | 10.2 | 68.72 | 1.3659 | 109 | 0.9 |
| 37.52 | 2.3971 | 103 | 0.9 | 70.24 | 1.3401 | 284 | 2.5 |
| 38.10 | 2.3621 | 171 | 1.5 | 70.42 | 1.3370 | 205 | 1.8 |
| 39.71 | 2.2697 | 503 | 4.3 | 71.25 | 1.3236 | 503 | 4.3 |
| 40.66 | 2.2189 | 224 | 1.9 | 73.63 | 1.2865 | 163 | 1.4 |
| 41.25 | 2.1885 | 87 | 0.8 | 73.78 | 1.2842 | 96 | 0.8 |
| 41.80 | 2.1609 | 590 | 5.1 | 75.76 | 1.2555 | 230 | 2.0 |
| 43.21 | 2.0939 | 520 | 4.5 | 75.94 | 1.2530 | 123 | 1.1 |
| 43.58 | 2.0769 | 388 | 3.4 | 79.63 | 1.2039 | 781 | 6.8 |
| 43.96 | 2.0597 | 511 | 4.4 | 79.84 | 1.2013 | 463 | 4.0 |
| 44.65 | 2.0296 | 152 | 1.3 | 80.21 | 1.1966 | 834 | 7.2 |
| 44.76 | 2.0247 | 144 | 1.2 | 80.44 | 1.1939 | 422 | 3.7 |
| 45.22 | 2.0053 | 402 | 3.5 | 81.83 | 1.1771 | 189 | 1.6 |

I claim:

1. A crystalline alkali metal phosphorus compound of the general formula:

$$x(R_2O).Al_2O_3.y(P_2O_5).z(H_2O)$$

wherein R is an alkali metal, x is an integer from 1 to 4, y is an integer from 1 to 2, and z is a number, to include fractions, from 2 to 3.5, said compound having essentially an X-ray diffraction pattern selected from the group consisting of the X-ray diffraction patterns of Tables II and IV.

2. A crystalline sodium aluminum phosphorus compound comprising from about 15 to about 32% $Al_2O_3$, from about 16 to about 38% $Na_2O$, from about 32 to about 40% $P_2O_5$, and from about 6 to about 15% water to include bound water and water of hydration, said compound having essentially an X-ray diffraction pattern selected from the group consisting of the X-ray diffraction patterns of Tables II and IV.

3. A compound of claim 1 of the general formula:

$$Na_2O.Al_2O_3.P_2O_5.2H_2O.$$

4. A compound of claim 1 of the general formula:

$$4Na_2O.Al_2O_3.2P_2O_5.2.5H_2O.$$

5. A compound of claim 1 comprising about 32% $Al_2O_3$, about 16.7% $Na_2O$, about 40% $P_2O_5$ and about 11.3% water to include bound water and water of hydration.

6. A compound of claim 1 comprising about 15.2% $Al_2O_3$, about 38% $Na_2O$, about 40% $P_2O_5$ and about 6.8% water to include bound water and water of hydration.

7. A crystalline compound having an X-ray diffraction pattern exhibited in Table II and the rod-like structure depicted in FIG. 1.

8. A crystalline compound having an X-ray diffraction pattern shown in Table III and a rod-like structure depicted in FIG. 2.

9. A crystalline compound having an X-ray diffraction pattern shown in Table IV and a rod-like structure depicted in FIG. 3.

10. A process for preparing an alkali metal aluminum phosphorus compound of the general formula:

$$x(R_2O).Al_2O_3.y(P_2O_5).z(H_2O)$$

wherein R is an alkali metal, x is an integer from 1 to 4, y is an integer from 1 to 2, and z is a number, to include fractions, from 2 to 3.5, said compound having essentially an X-ray diffraction pattern selected from the group consisting of the X-ray diffraction patterns of Tables II to IV, which comprises reacting a phosphate of the formula $(R)_a(H)_bPO_4$, wherein R is as previously defined, and a is an integer of from 1 to 3, and $b=3-a$ with aluminum hydroxide or a water-soluble aluminum salt at a temperature of at least about 150° C.

11. The process of claim 10 wherein the reaction temperature is between about 150° C. and about 250° C.

12. The process of claim 10 wherein R is sodium.

13. The process of claim 10 wherein aluminum hydroxide is reacted.

14. The process of claim 10 wherein the molar ratio of aluminum to phosphorus is between about 1 and about 2.5.

* * * * *

UNITED STATES PATENT AND TRADEMARK OFFICE
CERTIFICATE OF CORRECTION

PATENT NO. : 5,069,889
DATED : December 3, 1991
INVENTOR(S) : Chanakya Misra

It is certified that error appears in the above-identified patent and that said Letters Patent is hereby corrected as shown below:

Table III, Column 7, NET-C/S, line 14, Change "34" to read --84--.

Signed and Sealed this

Sixteenth Day of March, 1993

Attest:

STEPHEN G. KUNIN

*Attesting Officer*   Acting Commissioner of Patents and Trademarks